Sept. 14, 1943. A. W. McCARTER 2,329,354
TRANSMISSION
Filed Oct. 3, 1940 3 Sheets-Sheet 2
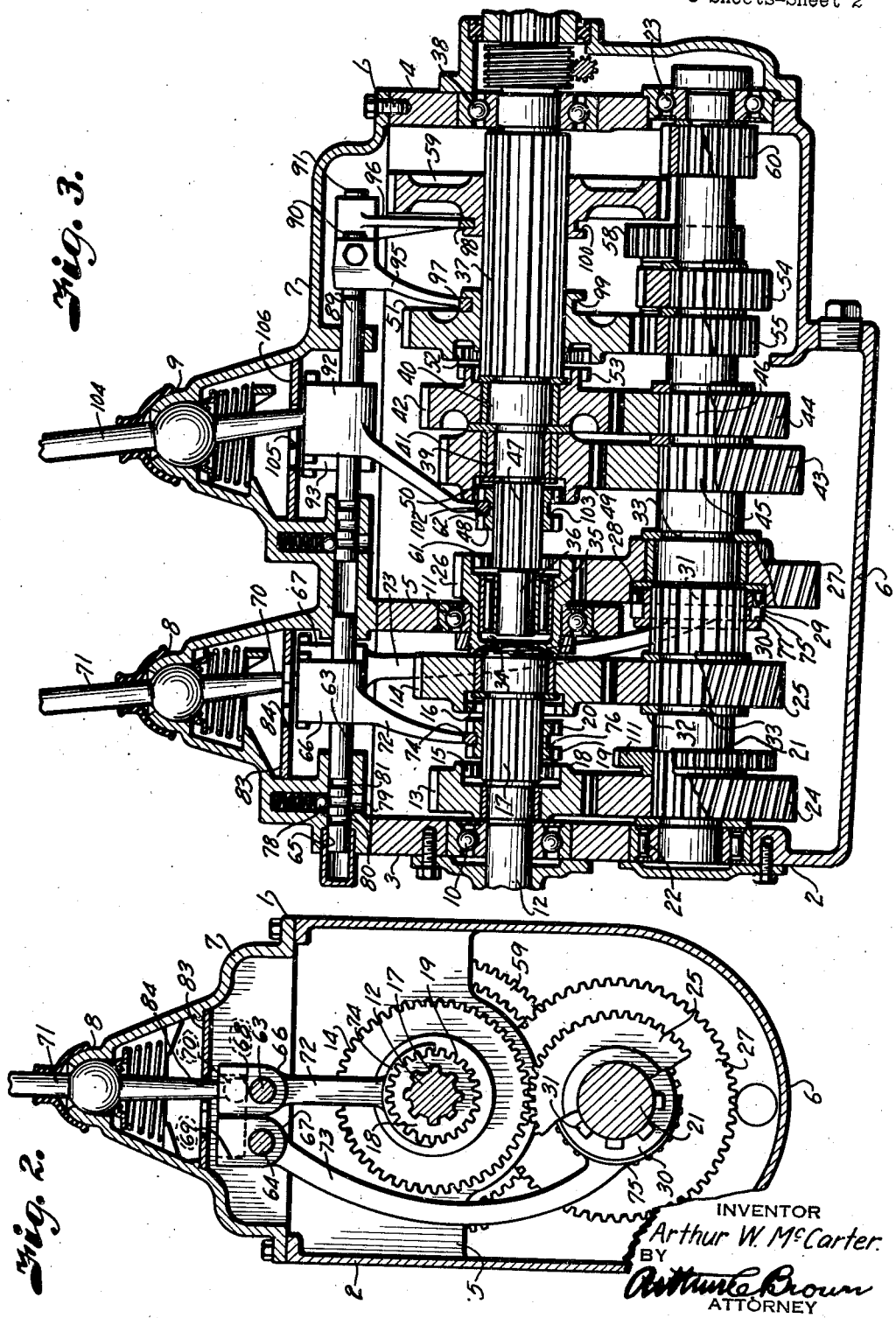
INVENTOR
Arthur W. McCarter.
BY
ATTORNEY

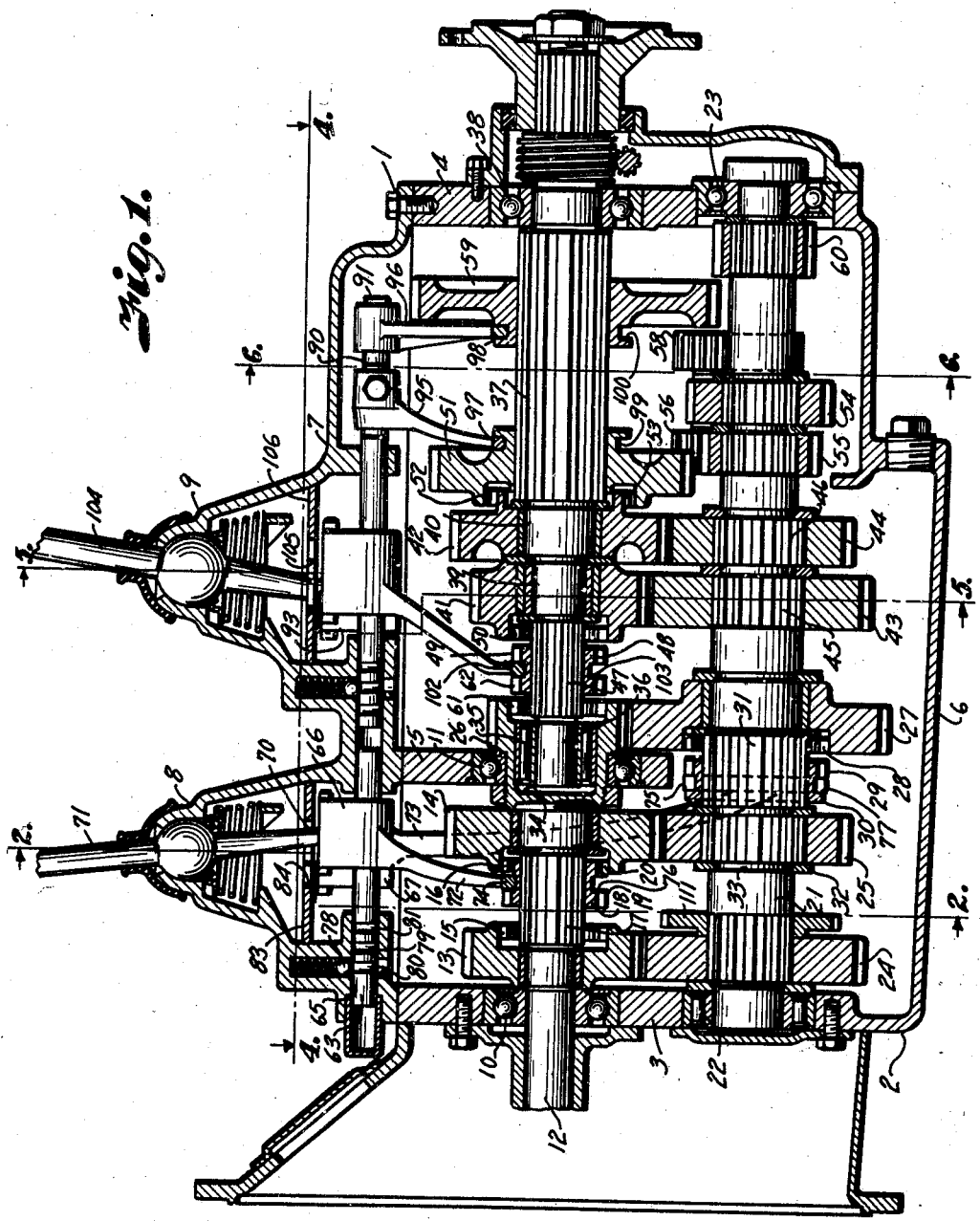

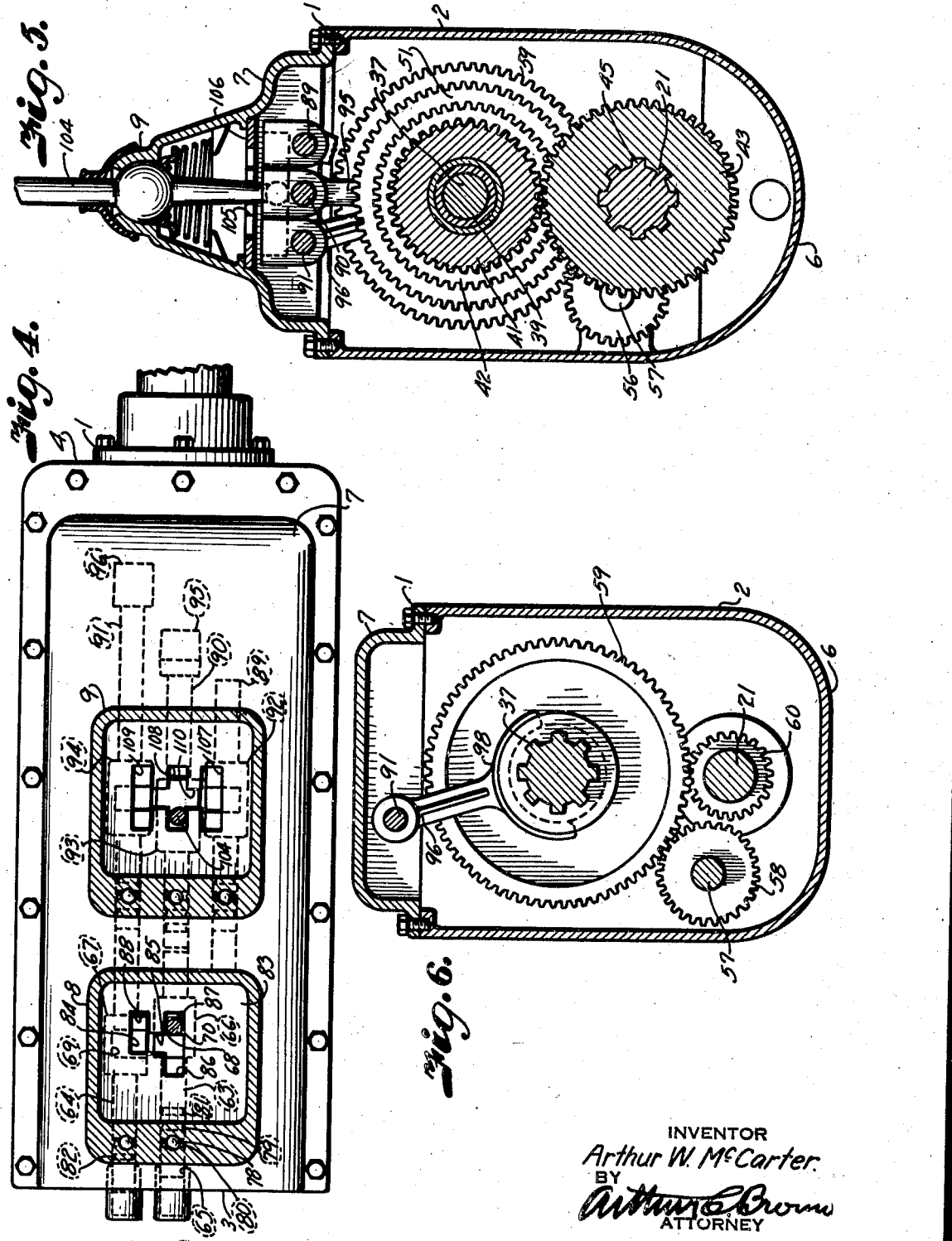

Patented Sept. 14, 1943

2,329,354

UNITED STATES PATENT OFFICE 2,329,354

TRANSMISSION

Arthur W. McCarter, Topeka, Kans.

Application October 3, 1940, Serial No. 359,497

3 Claims. (Cl. 74—333)

This invention relates to speed changing transmissions particularly adapted for use in trucks, tractors, and other vehicles operating under widely varying load and highway conditions.

It is well known that present transmissions are designed to give a single speed with each set of speed change gears, and the driving speeds, therefore, are not sufficient to accommodate all load and road conditions, especially in the present day motor transportation of freight. Another difficulty with present speed change mechanisms is that only a single speed is provided in reverse with the result that the vehicle can back only at one speed, and this speed is such as to be operative under maximum load conditions. The reverse speed is, therefore, extremely slow and inefficient when it is desired to back the vehicle with a lighter load and over longer distances.

It is the purpose of the present invention to overcome these difficulties by providing a speed change transmission having a plurality of selective speeds for each set of speed change gears and to provide a plurality of reverse speeds so that the vehicle may be operated more efficiently and in accordance with any load and road conditions.

Other objects of the invention are to provide a speed change gearing of this character having less bearing supports for the various shafts with better load distribution therein; and to provide a multiple number of reverse and forward speeds so arranged that it is impossible for any two sets of speed change gears to be engaged at the same time.

In accomplishing these and other objects of the invention, as hereinafter pointed out, I have provided improved details of structure, the preferred form of which is illustrated in the accompanying drawings, wherein:

Fig. 1 is a longitudinal section through a speed change transmission constructed in accordance with the present invention and showing the gears set to drive the countershaft at one of a plurality of selective speeds.

Fig. 2 is a cross-section through the transmission on the line 2—2 of Fig. 1.

Fig. 3 is a longitudinal section through the transmission, similar to Fig. 1 but showing the transmission set to operate the countershaft at a different selective speed.

Fig. 4 is a horizontal section on the line 4—4 of Fig. 1, particularly illustrating positions of the gear shift levers.

Fig. 5 is a cross-section through the transmission on the line 5—5 of Fig. 1.

Fig. 6 is a cross-section on the line 6—6 of Fig. 1.

Referring more in detail to the drawings:

1 designates a speed change transmission embodying the features of the present invention and including a case 2 having end walls 3—4, and a partition 5 spaced from the bottom 6. Closing the top of the case is a cover 7 carrying gear shift mechanisms 8 and 9.

Rotatably mounted in suitable bearings 10 and 11 in the end wall 3 and partition 5 is a driving or power shaft 12. Mounted on the driving shaft, intermediate the end wall and partition, are differentially sized gears 13—14 having recessed faces provided with clutch engaging teeth 15 and 16 respectively. Formed on the shaft, intermediate the gears, are splines 17 slidably keying a clutch collar 18 having teeth 19 and 20 adapted to respectively engage the teeth 15 or 16, so that either one of the gears may be connected in driving relation with the shaft 12 to operate a countershaft 21 at a plurality of speeds. The countershaft 21 is rotatably mounted in suitable bearings 22 and 23 in the end walls 3 and 4 at a point below the power shaft. Splined on the countershaft and meshing with the gears 13 and 14 are countershaft gears 24 and 25. In order to drive the countershaft at an additional speed, the end of the shaft 12 projects beyond the partition 5 and carries a gear 26 which meshes with a gear 27 normally freely rotatable on the countershaft 21. The gear 27 has a recessed face provided with internal teeth 28 adapted to be engaged by the teeth 29 on a clutch collar 30. The clutch collar 30 is drivingly connected with the countershaft by splines 31. Thus when the clutch collar 18 is in neutral position between the gears 13 and 14, and the clutch collar 30 is in engagement with the gear 27, the gear 26 rotates the gear 27 to drive the countershaft at a speed differential to the speed gears 24 and 25.

The gears 14 and 25 are of a relative diameter so as to rotate the countershaft at a higher speed than the driving or power shaft, and the set of gears 13—24 and 26—27 are of relative diameters to rotate the countershaft at lower speeds than the power shaft so as to give one increased speed or overdrive of the countershaft, and two reduced speeds. The normally freely revolving gears 13, 14 and 27 are suitably retained in position on their respective shafts, for example by lock rings 32 received in annular grooves 33 formed in the shafts. The rings 32 bear against faces of the gears in cooperation with stop shoulders at the opposite sides of the gears. The end of the power shaft which is rotatably mounted in the partition 5 is enlarged to accommodate a bearing recess 34 receiving an antifriction bearing 35 for rotatably mounting the end 36 of a driven shaft 37 which has its opposite end rotatably mounted in an antifriction bearing 38 carried by the end wall 4 in coaxial alignment with the bearings 10, 11 and 34.

The driven shaft 37 may be of conventional design, such as that used in an ordinary truck transmission speed change gearing, and carries a plurality of speed change gears. In the illustrated instance, the driven shaft has spaced cylindrical portions 39 and 40 on which are rotatably mounted differential sized gears 41 and 42 meshing with complementary gears 43 and 44 fixed to the countershaft by splines 45 and 46 so that the countershaft gears drive the gears on the driven shaft at differential speeds. To render the gear 41 effective to drive the driven shaft, the driven shaft includes a splined portion 47 on which is slidably secured a clutch collar 48 having teeth 49 adapted to engage internal teeth 50 formed in the recessed face of the gear 41.

Slidably fixed on the driven shaft is a gear 51, having clutch teeth 52 engageable with clutch teeth 53 on the gear 42 to render the gear 42 effective in driving the driven shaft. The gear 51 is adapted to mesh with a gear 54 splined on the countershaft to drive the countershaft at a lower speed than the gears previously referred to, the gear 51 being slidably movable into engagement with the gear 54.

The transmission is also provided with a reverse gear including a gear 55 fixed on the countershaft and meshing with a gear 56 fixed on a stub-shaft 57 to drive a reverse gear 58 fixed on the shaft 57 in position to be slidably engaged by a gear 59 which is splined on the driven shaft, whereby the driven shaft may be reversed relatively to the power or driving shaft. The countershaft also includes a lower speed gear 60 adapted to be slidably engaged by the gear 59 to rotate the driven shaft at a lower speed than the speeds effected by the gear sets 43—41, 44—42, and 54—51.

In order to provide a direct drive of the driven shaft at the speed of the power shaft, the gear 26 has internal teeth 61 adapted to be engaged by external teeth 62 on the clutch collar 48.

The collars 18 and 30 are shifted on their respective shifts by the gear shift mechanism 8 which includes a pair of shift bars 63 and 64 that are slidable in bearings 65 formed in the transmission casing cover 7. Fixed on the bars 63 and 64 are heads 66 and 67 having facing recesses 68 and 69 to be selectively engaged by the ball end 70 of a gear shift lever 71, as in conventional transmission construction. Depending from the heads 66 and 67 are arms 72 and 73 carrying yokes 74 and 75 engaged in grooves 76 and 77 of the clutch collars 18 and 30 respectively. The bars 63 and 64 are retained in neutral position to maintain the clutch collars out of engagement with the clutch teeth of the respective gears by means of spring-pressed latch balls 78 engageable in grooves 79 in the ends of the bars 63 and 64. Since there are three positions for the clutch collar 18 (neutral, engagement with the gear 13, and engagement with the gear 14), the bar 63 has latch engaging grooves 80 and 81 on the respective sides of the groove 79 to hold the clutch collar in position for engaging the clutch teeth of one or the other of the gears 13 or 14. The bar 64 also has a groove 82 to retain the teeth of the clutch collar 30 in engagement with the teeth of the gear 27. Movement of the gear lever to select and shift the selected gear is controlled by a plate 83, having a slot 84 therein through which the gear shift lever extends, as clearly shown in Figs. 1 and 4. The slot 84 forms a transverse passageway 85 through which the gear shift lever is moved from engagement with one of the yoke shifting heads to the other and lateral notches 86, 87 and 88 to respectively hold the lever in position to be maintained when a predetermined position of one of the gears is selected as in conventional shifting mechanisms.

The shift mechanism 9 also includes parallel rods 89, 90 and 91. Fixed to the shift rods 89, 90 and 91 are shifting heads 92, 93 and 94 respectively. Also fixed on the rods 90 and 91 are arms 95 and 96 carrying yokes 97 and 98 engageable in grooves 99 and 100 of the gears 51 and 59, respectively. The shift head 94 has an arm carrying a yoke 102 engageable in a groove 103 of the clutch collar 48, previously described. The shift mechanism 9 also includes a shaft lever 104 projecting through a slot 105 in a plate 106, the slot including parallel longitudinal passageways 107, 108 and 109 interconnected by a transverse passageway 110 so that the gear shaft lever is guided to move through its required positions when selecting and shifting the desired gears.

If desired, a power take-off gear 111 may be keyed to the countershaft for driving a power take-off mechanism (not shown). Since the countershaft has three speeds relatively to the driving shaft, the power mechanism may be operated at three speeds when the change speed gears manipulated by the shift mechanism 9 are in neutral position.

In using the transmission, the lowest speed is accomplished by shifting the gear 59 in engagement with the gear 60 and moving the clutch collar 30 into engagement with the gear 27. The driving or power shaft then rotates the gear 27 and countershaft 21 through the spline connection of the clutch collar 30 to rotate the gear 59. A slightly higher speed can be effected by shifting the clutch collar 18 into driving engagement with the gear 13, or a still higher speed may be obtained through the gears 60 and 59 by engaging the clutch collar 18 with the gear 14. Higher speeds may be similarly obtained by meshing the gear 51 with the gear 54 to give three additional speeds with these gears. Three speeds may also be attained in a similar manner with the gears 42 and 44 and also with the gears 41 and 43. Direct drive is effected by sliding the clutch collar 48 into engagement with the clutch teeth 61 of the gear 26 so that the driving shaft is directly coupled to the driven shaft. Reverse gear is accomplished by moving the gear 59 in engagement with the gear 58 and three reverse speeds may be accomplished by engaging the clutch collar 18 with the gear 13, by engaging the clutch collar 18 with the gear 14, or by engaging the clutch collar 30 with the gear 27.

It is thus obvious that I have provided a change speed gearing whereby a plurality of speeds may be accomplished through each one of the set of gears connecting the countershaft with the driving shaft so that a speed may be effected best suited to the load and highway conditions, and whereby the vehicle may be operated at maximum efficiency.

What I claim and desire to secure by Letters Patent is:

1. A speed change transmission including, a casing, a driving shaft rotatably supported in the casing, a coaxially arranged driven shaft supported in the casing, a gear fixed on the driving shaft, a pair of gears rotatably supported on the driving shaft and having clutch engaging portions, a clutch member slidably keyed on the driving shaft and adapted to selectively engage said clutch engaging portions of the gears, a countershaft rotatably supported in the casing in driving relation with the coaxially arranged shafts, gears fixed on the countershaft and meshing with the gears rotatable on the driving shaft, said gears having relative diameters to provide an overdrive and an underdrive of the countershaft relative to the driving shaft, a gear rotatably supported on the countershaft in meshing relation with the fixed gear on the driving shaft and having clutch engaging portions, a clutch member slidably keyed on the countershaft for engaging said clutch engaging portions of the last named gear, control means for selectively rendering said clutch members effective for providing said countershaft with a plurality of speed ratios, a plurality of sets of differentially sized gears connecting the countershaft with the driven shaft, one of said sets providing an overdrive of the driven shaft relative to the countershaft, and a separate control means for rendering said gear sets effective for transmitting a multiple of the speed ratios of the countershaft to the driven shaft.

2. A speed change transmission including, a casing, a driving shaft rotatably supported in the casing, a coaxially arranged driven shaft supported in the casing, means on the driven shaft for selectively engaging the driving shaft to establish direct driving connection with the driving shaft, a pair of spaced gears rotatable on the driving shaft and having clutch engaging portions, a countershaft rotatably supported in the casing, a pair of gears fixed on the countershaft and having meshing engagement with the respective gears on the driving shaft, a clutch member having two clutch faces slidably keyed on the driving shaft, means for selectively shifting said clutch member from neutral in either direction for engaging the respective gear clutch engaging portions, a gear fixed to the driving shaft, a gear rotatably mounted on the countershaft having meshing engagement with the fixed gear on the driving shaft, said gear having clutch engaging portions, a clutch member slidably keyed on the countershaft, means for shifting said clutch member from neutral for engaging the clutch engaging portion on the gear for effecting rotation of the countershaft, means for controlling shifting of the respective clutch shifting means to permit engagement of only one clutch and gear at a time, each of said gears on the respective shafts being of different relative sizes to drive the countershaft at different speed ratios, a plurality of change speed gear sets on the countershaft and driven shaft selectively operable to connect the countershaft and driven shaft together at different speed ratios, suitable means for effecting operation of the gear sets for transmitting a selective multiple of the rotational speed of the countershaft to the driven shaft.

3. A speed change transmission including, a casing, a driving shaft rotatably supported in the casing, a coaxially arranged driven shaft supported in the casing, a countershaft rotatably supported in the casing at one side of the driving and driven shafts, a pair of gears rotatably mounted on the driving shaft, a pair of gears keyed to the countershaft and having meshing engagement with the respective gears on the driving shaft, a gear fixed to the driving shaft, a gear rotatable on the countershaft having meshing engagement with the gear fixed to the driving shaft, said gears being adapted for selectively driving said countershaft at different speed ratios, a plurality of gear sets including a reversed gear train on the countershaft and driven shaft for selectively transmitting different speed ratios from said countershaft to said driven shaft, shiftable means for effecting selective operation of the gear sets on the countershaft and driven shaft, and separate shifting means for effecting selective operation of the gear sets on the driving shaft and countershaft for effecting a drive at a selected one of a plurality of multiples of a speed ratio including the reverse between the countershaft and the driven shaft, and means operable by the first named shiftable means for directly connecting the drive and driven shafts independently of the position of the separate shifting means.

ARTHUR W. McCARTER.